(12) United States Patent
Wang et al.

(10) Patent No.: US 11,821,538 B2
(45) Date of Patent: Nov. 21, 2023

(54) MECHANICAL AND ELECTRONIC DUAL CONTROL WATER TAP

(71) Applicant: RUNNER(XIAMEN) CORP., Fujian (CN)

(72) Inventors: Yongsheng Wang, Fujian (CN); Yonglong Zhang, Fujian (CN); Dingjun Wang, Fujian (CN); Wen Gao, Fujian (CN)

(73) Assignee: RUNNER(XIAMEN) CORP.

( * ) Notice: Subject to any disclaimer, the term of this patent is extended or adjusted under 35 U.S.C. 154(b) by 361 days.

(21) Appl. No.: 17/138,978

(22) Filed: Dec. 31, 2020

(65) Prior Publication Data

US 2021/0278009 A1   Sep. 9, 2021

(30) Foreign Application Priority Data

Mar. 6, 2020   (CN) .......................... 202010152088.4

(51) Int. Cl.
| | |
|---|---|
| *F16K 31/06* | (2006.01) |
| *E03C 1/04* | (2006.01) |
| *F16K 11/078* | (2006.01) |
| *F16K 37/00* | (2006.01) |

(52) U.S. Cl.
CPC ............ *F16K 31/0617* (2013.01); *E03C 1/04* (2013.01); *F16K 11/0787* (2013.01); *F16K 37/005* (2013.01)

(58) Field of Classification Search
CPC ............. F16K 31/0617; F16K 11/0787; F16K 37/005; E03C 1/055; E03C 1/04
See application file for complete search history.

(56) References Cited

U.S. PATENT DOCUMENTS

| | | | | |
|---|---|---|---|---|
| 5,853,023 | A * | 12/1998 | Orlandi ............... | F16K 11/0787 137/271 |
| 9,194,110 | B2 * | 11/2015 | Frick ...................... | E03C 1/055 |
| 2007/0044850 | A1 * | 3/2007 | Pieters ................ | F16K 11/0787 137/597 |

(Continued)

FOREIGN PATENT DOCUMENTS

CN          209671737    *  8/2018

*Primary Examiner* — J C Jacyna
(74) *Attorney, Agent, or Firm* — Jose Cherson Weissbrot

(57) ABSTRACT

The invention discloses A mechanical and electronic dual control water tap, including faucet group, control box and sensor, the sensor is arranged on the faucet group, and the faucet group is provided with a mixing valve; the mixing valve is internally arranged a cold water inlet, a hot water inlet, a first mixed water outlet and a second mixed water outlet are arranged; the second mixed water outlet is a normal water outlet channel; the control box includes a detection control unit, a first inflow runner, a second inflow runner and a mixed outlet channel; the first mixed water outlet is connected with the first inflow runner, and the second mixed water outlet is connected with the second inflow runner the first inflow runner and the second inflow runner are respectively provided with inductor and solenoid valves. The double control water outlet faucet of the invention can effectively solve the problem that the existing electronic outlet faucet fails or cannot be used when the power is off, and greatly improves the user's experience.

9 Claims, 6 Drawing Sheets

(56) References Cited

U.S. PATENT DOCUMENTS

| | | | | |
|---|---|---|---|---|
| 2011/0210276 A1* | 9/2011 | Chen | ................... | G05D 23/193 |
| | | | | 251/129.01 |
| 2011/0297248 A1* | 12/2011 | Nelson | ...................... | E03C 1/04 |
| | | | | 137/561 R |
| 2015/0292187 A1* | 10/2015 | Tseng | ................... | E03C 1/0412 |
| | | | | 4/677 |
| 2020/0340221 A1* | 10/2020 | Peng | ........................ | E03C 1/04 |

\* cited by examiner

MECHANICAL AND ELECTRONIC DUAL CONTROL WATER TAP

CROSS-REFERENCE TO RELATED APPLICATIONS

This application claims priority to China Patent application No. 202010152088.4 filed Mar. 6, 2020, all of which are hereby incorporated herein in their entireties by reference.

FIELD AND BACKGROUND OF THE INVENTION

1. Technical Field

The present invention relates to A mechanical and electronic dual control water tap.

2. Description of Related Art

The existing induction kitchen faucet is liked by users because of its non-contact water control, convenient and practical, and simple operation. However, the existing induction kitchen faucets are water supply in series. When the induction device fails or the power supply device is cut off, it can not be used continuously, and there is a pain point in use.

BRIEF SUMMARY OF THE INVENTION

To overcome the defects mentioned above, the present invention provides A mechanical and electronic dual control water tap.

To achieve the foregoing objective, the present invention adopts the following solution: A mechanical and electronic dual control water tap, including faucet group, control box and sensor, the sensor is arranged on the faucet group, and the faucet group is provided with a mixing valve; the mixing valve is internally arranged a cold water inlet, a hot water inlet, a first mixed water outlet and a second mixed water outlet are arranged; the second mixed water outlet is a normal water outlet channel; the control box includes a detection control unit, a first inflow runner, a second inflow runner and a mixed outlet channel; the first mixed water outlet is connected with the first inflow runner, and the second mixed water outlet is connected with the second inflow runner the first inflow runner and the second inflow runner are respectively provided with inductor and solenoid valves.

Preferably, the inductor is a flowmeter.

Preferably, the mixing valve is matched with the valve seat, and the valve seat is provided with a cold water inlet pipe, a hot water inlet pipe, a first water outlet channel and a second water outlet channel. The cold water inlet pipe and the hot water inlet pipe are respectively connected with the cold water inlet and the hot water inlet respectively, and the first mixed water outlet and the first water inlet channel are sealed and communicated with each other through the first outlet channel, the second mixed water outlet and the second water inlet channel are sealed and communicated with each other through the second water outlet channel.

Preferably, the cold water inlet, the hot water inlet, the first mixed water outlet and the second mixed water outlet are arranged in parallel at the bottom end of the mixing valve.

Preferably, the cold water inlet, the hot water inlet and the first mixed water outlet are arranged in parallel at the bottom end of the mixing valve, and the second mixed water outlet is arranged at the side end of the mixing valve.

Preferably, the faucet group includes a body assembly, which comprises a shell, a elbow and a water outlet nozzle, the shell and the water outlet nozzle are respectively connected to the opposite ends of the elbow, and the sensor is installed inside the elbow.

Preferably, the upper end of the mixing valve is provided with a control switch which is connected with the handle group to connect or block the water outlet of the first mixed water outlet.

Preferably, the control switch is connected with the handle group by a gland.

Preferably, the control box also includes a power supply module which is connected with the detection control unit.

Compared with the prior art, the present invention has the following beneficial effects:

The mechanical and electronic double control water tap of the invention has simple structure and low cost, the induction type electronic water outlet and the mechanical control water outlet are controlled in parallel, and the two can operate independently, even if the electronic control water outlet cannot be used, the mechanical control water outlet can be directly used; at the same time, the double control outlet faucet can realize the temperature regulation mode on the stage, which is very convenient and fast; in addition, the double control outlet faucet of the invention can effectively solve the problem that the existing electronic outlet faucet fails or cannot be used when the power is off, solves the pain point, and greatly improves the user's use experience.

BRIEF DESCRIPTION OF THE DRAWINGS

In order to explain the technical scheme of the invention more clearly, the following will give a brief introduction to the embodiments or the drawings needed in the description of the prior art, Obviously, the drawings described below are only some embodiments of the invention, For ordinary technical personnel in the art, other attachments can be obtained according to these drawings without paying creative labor Figure.

DESCRIPTION OF THE PREFERRED EMBODIMENTS

In the following, the technical scheme in the embodiment of the invention will be described clearly and completely in combination with the drawings in the embodiment of the invention, obviously, the described embodiment is only a part of the embodiment of the invention, not all the embodiments. Based on the embodiment of the invention, all other embodiments obtained by ordinary technical personnel in the art without making creative labor belong to the scope of protection of the invention.

Figure 1:
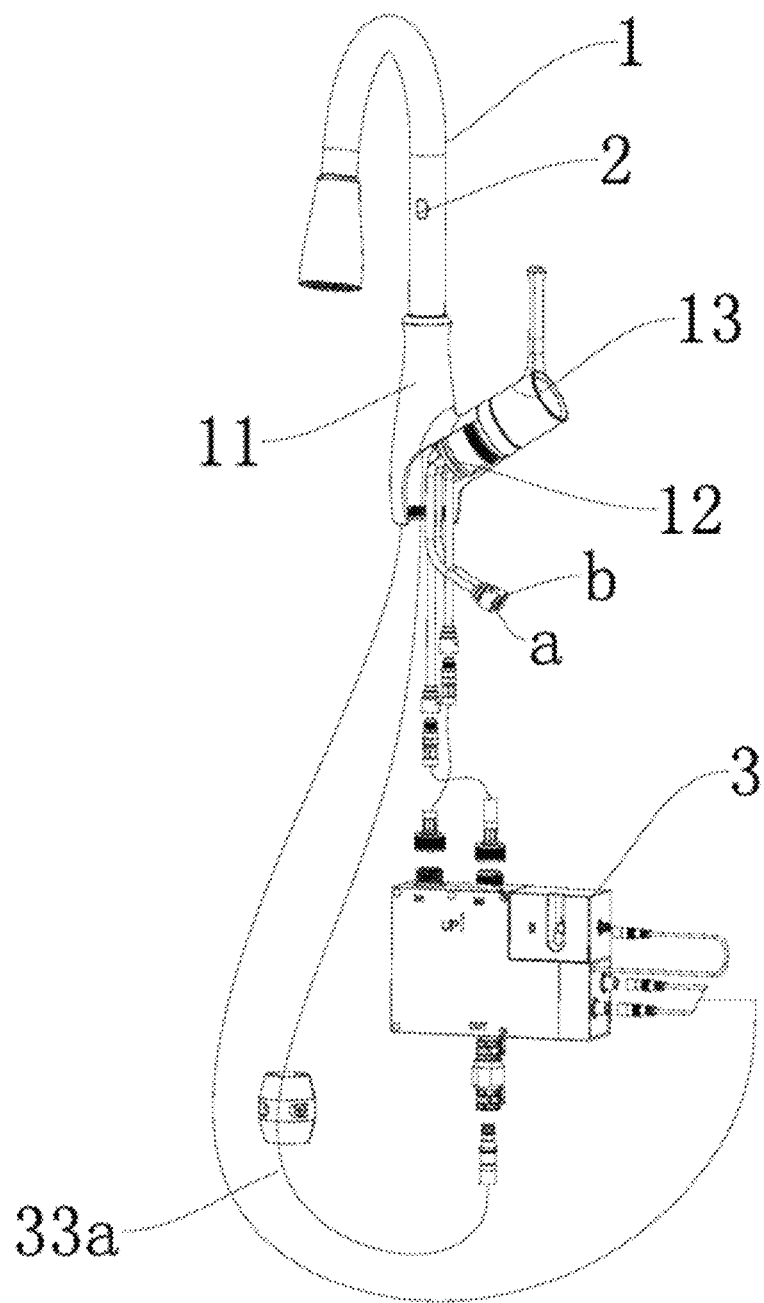
FIG. 1 is a stereogram of the present invention.
Figure 6:
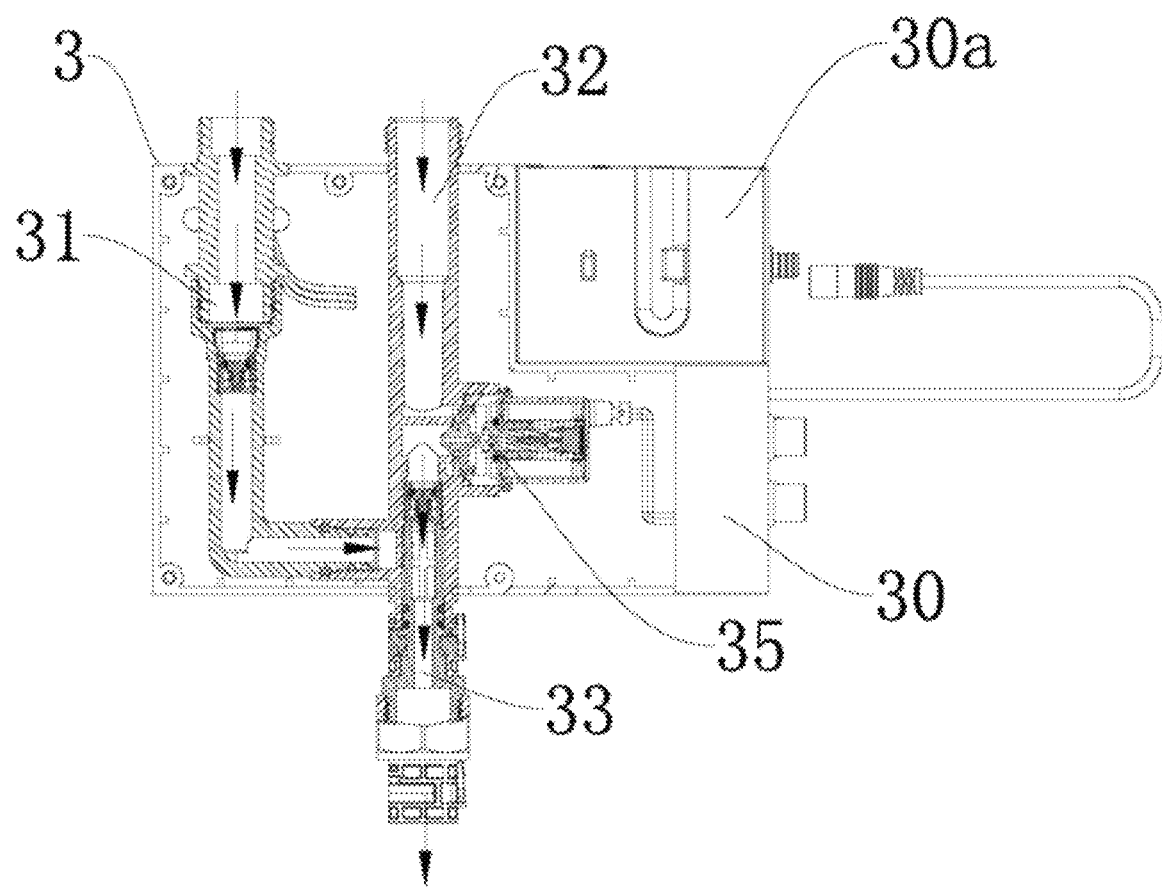
FIG. 6 is a schematic diagram of the workflow of the invention.

As is shown in FIG. 1 and FIG. 6, a mechanical and electronic dual control water tap, including faucet group 1, sensor 2 and control box 3, the faucet group 1 includes a body assembly 11, the faucet group 1 includes body assembly 11, valve body 12 and handle group 13; the body assembly 11 includes a shell 11a, a elbow 11b and a water outlet nozzle 11c, among them, the shell 11a and the water outlet nozzle 11c are respectively connected to the opposite ends of the elbow 11b, and the sensor 2 is installed inside the elbow 11b, of course, the sensor 2 can also be installed at any other position of the body assembly 11, as long as it can realize the induction to the human body; the valve body 12 comprises a seat 12a and a mixing valve 12b, the valve seat 12a is provided with a seat body 121, a cold water inlet pipe a, a hot water inlet pipe b, a first water outlet channel c and a second water outlet channel d connected with a through hole on the seat body, the mixing valve 12b is provided with a cold water inlet 123, a hot water inlet 124, a first mixed water outlet 125 and a second mixed water outlet 126, the cold water inlet 123, the hot water inlet 124, the first mixed water outlet 125 and the second mixed water outlet 126 are connected with the cold water inlet pipe a, the hot water inlet pipe b, the first water outlet channel c and the second water outlet channel d on the seat body respectively, the second mixed water outlet 126 is the normal outlet state of the cold and hot water after mixing and regulating the temperature; At the same time, the upper end of the mixing valve 12b is provided with a control switch 127, which is used to connect or block the water outlet state of the first mixed water outlet 125. The control switch 127 is connected with the handle group 13 by the gland 131, and then the control of the handle group 13 is used to realize the opening or closing of the outlet faucet, and the outlet water temperature of the outlet faucet is adjusted, among them, the opening and closing modes of the water outlet faucet are not limited to toggle (as shown in FIG. 3), press (as shown in FIG. 4) and rotate, as long as their corresponding functions can be realized.

Figure 3:
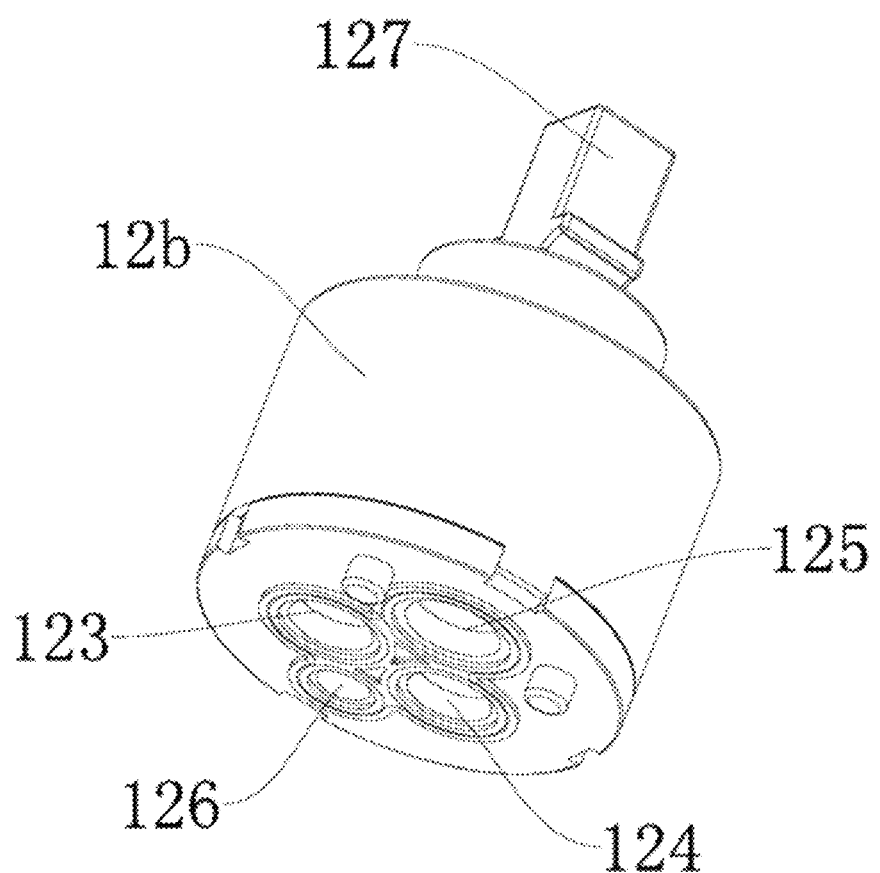
FIG. 3 is a stereogram of a mixing valve in an embodiment of the present invention.
Figure 4:
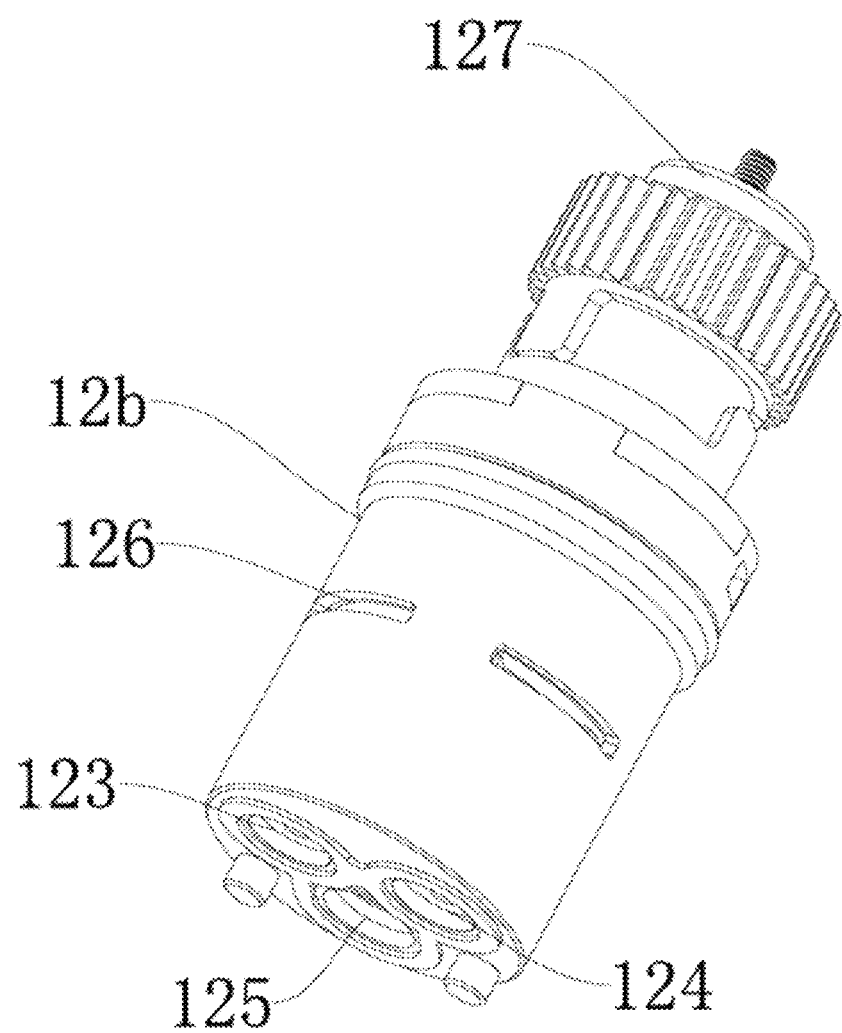
FIG. 4 is a stereogram of a mixing valve in another embodiment of the present invention.

Preferably, combined with FIG. 3, The cold water inlet 123, the hot water inlet 124, the first mixed water outlet 125 and the second mixed water outlet 126 are arranged in parallel at the bottom end of the mixing valve 12b, which are sealed and communicated with the corresponding pipes of the valve seat, among them, the second mixed water outlet 126 is a normal outlet channel; in another preferred embodiment, referring to FIG. 4, the above-mentioned cold water inlet 123, hot water inlet 124, and the first mixed water outlet 125 are arranged in parallel at the bottom end of the mixing valve 12b, the second mixed water outlet 126 is arranged at the side end of the mixing valve 12b, and the second mixed water outlet 126 is a normal outlet channel.

Figure 2:
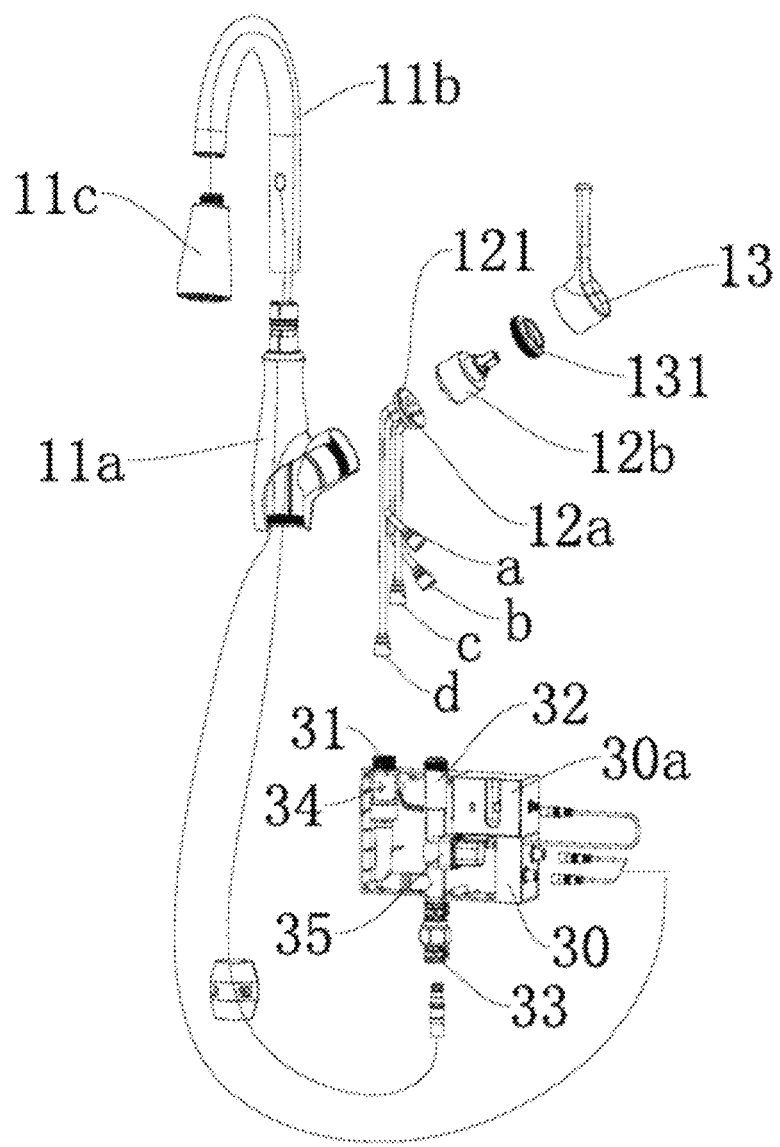
FIG. 2 is an exploded view of the present invention.
Figure 5:
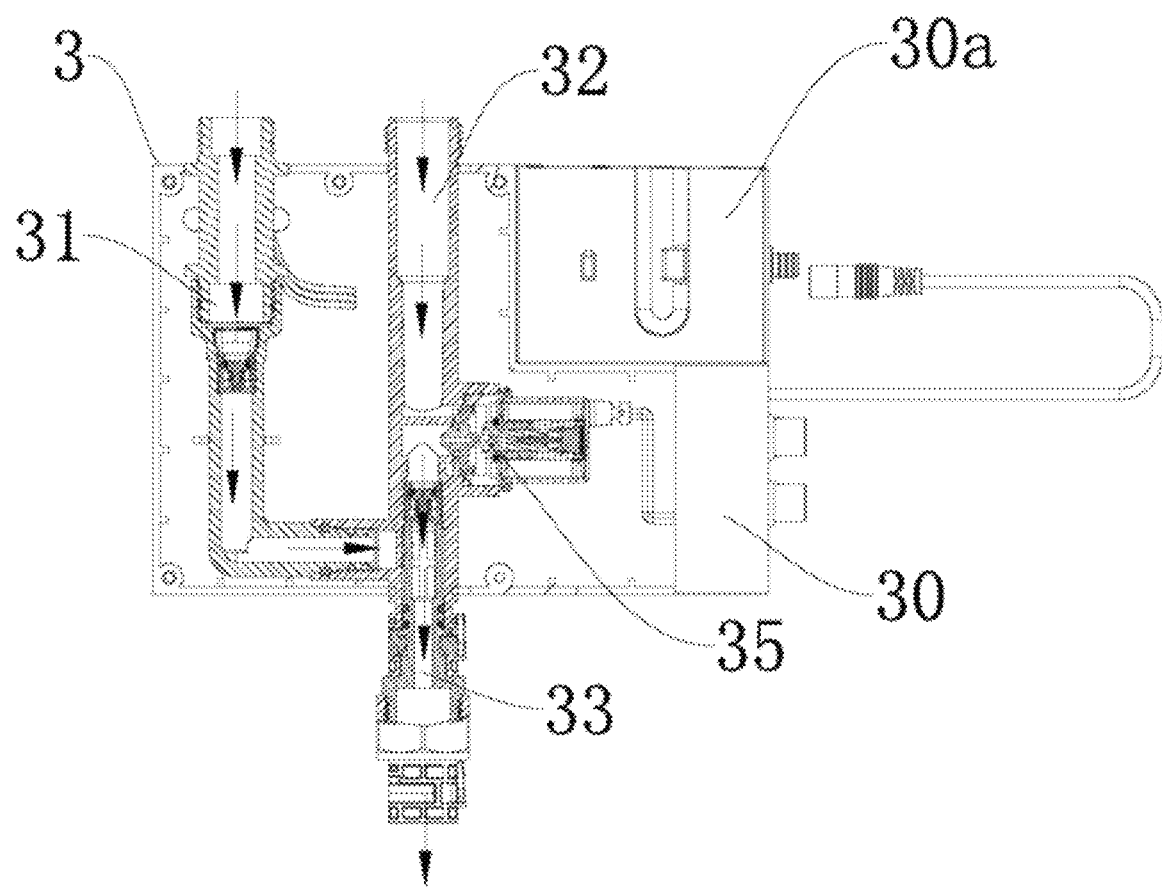
FIG. 5 is a sectional view of the control box of the present invention.

Combined with FIG. 2 and FIG. 5, the control box 3 is provided with a detection control unit 30, which supplies power to the control box 3 by using the power supply module 30a, meanwhile, the control box 3 is provided with a first inflow runner 31, a second water inflow runner 32 and a mixed water outlet channel 33, the mixed water outlet channel 33 is connected with the water outlet terminal, i.e. the outlet nozzle 11C, through the water passage 33A. The first mixed water outlet 125, the first outlet channel c and the first inflow runner 31 are sealed and communicated with each other in turn, and the second mixed water outlet 126, the second outlet channel d and the second inflow runner 32 are sealed and communicated with each other in turn; among them, a flowmeter 34 is arranged in the first inflow runner 31; of course, other sensors can also be arranged in the first inlet channel, so long as the function of transmitting the signal to the detection and control unit can be realized. At the same time, a solenoid valve 35 is arranged in the second inflow runner 32, and the flowmeter 34, the solenoid valve 35 and the sensor 2 are all connected with the detection and control unit 30.

Next, the specific working mode of the double control outlet faucet of the present invention will be explained in detail in combination with FIG. 5 and FIG. 6. If the user opens the valve body 12 through the handle group 13 (i.e. mechanical switch), the cold and hot water enter the mixing valve 12b through the cold water inlet pipe a and the hot water inlet pipe b respectively, and then flow from the first mixed water outlet 125 and the first outlet channel c to the first inlet channel 31 and flow meter 34 in the control box, and the water flow finally flows through the mixed outlet channel 33 to the outlet nozzle 11c for the user's use; when the valve body 12 is in the open state, the detection control unit 30 detects that the flowmeter 34 is in operation, at this time, the sensor 2 is in a dormant state under the control of the detection control unit 30, If a user approaches at this time, the sensor 2 cannot start the corresponding detection work, that is, the induction is invalid, that is, when the water outlet under mechanical control is in the sleep state.

In another case, if the user is directly close to the activation sensor 2, the detection control unit 30 will directly open the solenoid valve 35 after detecting the signal, after mixing with the mixing valve 12b, the cold and hot water will flow directly from the second mixed water outlet 126 and the second outlet channel d to the second inlet channel 32 in the control box, finally, the water flow will flow through the mixed outlet passage 33 to the outlet nozzle 11C for the user to make it available to the user for the purpose of making it possible for the user to make it possible Use; when the solenoid valve 35 is in the open state, if the user mistakenly triggers the control switch of the mixing valve, that is, the user mistakenly triggers the mechanical switch. At this time, the solenoid valve 35 will automatically close and become the state of using the mechanical switch for water outflow, that is, the electronic control water outlet will change into the mechanical control water outlet state.

The mechanical and electronic double control water tap of the invention has simple structure and low cost, the induction type electronic water outlet and the mechanical control water outlet are controlled in parallel, and the two can operate independently, even if the electronic control water outlet cannot be used, the mechanical control water outlet can be directly used; at the same time, the double control outlet faucet can realize the temperature regulation mode on the stage, which is very convenient and fast; in addition, the double control outlet faucet of the invention can effectively solve the problem that the existing electronic outlet faucet fails or cannot be used when the power is off, solves the pain point, and greatly improves the user's use experience.

The above description shows and describes preferred embodiments of the invention, as mentioned above, it should be understood that the invention is not limited to the forms disclosed herein, should not be regarded as an exclusion of other embodiments, but can be used for various other combinations, modifications and environments, and can be modified by the above-mentioned Teaching or technology or knowledge in related fields within the scope of the invention concept described herein. However, the modifications and changes made by personnel in the art do not deviate from the spirit and scope of the invention, and shall be within the protection scope of the claims attached to the invention.

What is claimed is:

1. A mechanical and electronic dual control water tap, wherein that including faucet group, control box and sensor, the sensor is arranged on the faucet group, and the faucet group is provided with a mixing valve; the mixing valve is internally arranged a cold water inlet, a hot water inlet, a first mixed water outlet and a second mixed water outlet are arranged; the second mixed water outlet is a normal water outlet channel; the control box includes a detection control unit, a first inflow runner, a second inflow runner and a mixed outlet channel; the first mixed water outlet is connected with the first inflow runner, and the second mixed water outlet is connected with the second inflow runner, the first inflow runner provided with inductor and the second inflow runner provided with solenoid valve, the inductor is a flowmeter, the flowmeter, the solenoid valve and the sensor are all connected with the detection and control unit.

2. A mechanical and electronic dual control water tap according to claim 1, wherein the mixing valve is matched with the valve seat, and the valve seat is provided with a cold water inlet pipe, a hot water inlet pipe, a first water outlet channel and a second water outlet channel, the cold water inlet pipe and the hot water inlet pipe are respectively connected with the cold water inlet and the hot water inlet respectively, and the first mixed water outlet and the first water inlet channel are sealed and communicated with each other through the first outlet channel, the second mixed water outlet and the second water inlet channel are sealed and communicated with each other through the second water outlet channel.

3. A mechanical and electronic dual control water tap according to claim 1, wherein the cold water inlet, the hot water inlet, the first mixed water outlet and the second mixed water outlet are arranged in parallel at the bottom end of the mixing valve.

4. A mechanical and electronic dual control water tap according to claim 1, wherein the cold water inlet, the hot water inlet and the first mixed water outlet are arranged in parallel at the bottom end of the mixing valve, and the second mixed water outlet is arranged at the side end of the mixing valve.

5. A mechanical and electronic dual control water tap according to claim 1, wherein the faucet group includes a body assembly, which comprises a shell, a elbow and a water outlet nozzle, the shell and the water outlet nozzle are respectively connected to the opposite ends of the elbow, and the sensor is installed inside the elbow.

6. A mechanical and electronic dual control water tap according to claim 1, wherein the upper end of the mixing valve is provided with a control switch which is connected with the handle group to connect or block the water outlet of the first mixed water outlet.

7. A mechanical and electronic dual control water tap according to claim 6, wherein the control switch is connected with the handle group by a gland.

8. A mechanical and electronic dual control water tap according to claim 1, wherein the control box also includes a power supply module which is connected with the detection control unit.

9. A mechanical and electronic dual control water tap according to claim 2, wherein the mixing valve is matched with the valve seat, and the valve seat is provided with a cold water inlet pipe, a hot water inlet pipe, a first water outlet channel and a second water outlet channel, the cold water inlet pipe and the hot water inlet pipe are respectively connected with the cold water inlet and the hot water inlet respectively, and the first mixed water outlet and the first water inlet channel are sealed and communicated with each other through the first outlet channel, the second mixed water outlet and the second water inlet channel are sealed and communicated with each other through the second water outlet channel.

* * * * *